United States Patent [19]

Beaver

[11] Patent Number: 4,822,460
[45] Date of Patent: Apr. 18, 1989

[54] ELECTROLYTIC CELL AND METHOD OF OPERATION

[75] Inventor: Richard N. Beaver, Angleton, Tex.
[73] Assignee: The Dow Chemical Company, Midland, Mich.
[21] Appl. No.: 886,770
[22] Filed: Jul. 16, 1986

Related U.S. Application Data

[63] Continuation of Ser. No. 667,949, Nov. 5, 1984, abandoned.

[51] Int. Cl.[4] .................... C25B 1/14; C25B 13/00
[52] U.S. Cl. .................................. 204/98; 204/128; 204/252; 204/282; 204/283
[58] Field of Search ............ 204/98, 128, 252, 263, 204/264, 265, 266, 282, 283

[56] References Cited

U.S. PATENT DOCUMENTS

| | | | |
|---|---|---|---|
| 3,378,480 | 4/1980 | Peinshagen et al. | 204/282 |
| 4,013,535 | 3/1977 | White | 204/98 |
| 4,013,537 | 3/1977 | White | 204/98 |
| 4,017,375 | 4/1977 | Pohto | 204/255 |
| 4,056,458 | 11/1977 | Pohto et al. | 204/263 |
| 4,069,128 | 1/1978 | Westerlund | 204/253 |
| 4,090,931 | 5/1978 | Montani et al. | 204/98 |
| 4,108,742 | 8/1978 | Seko et al. | 204/98 |
| 4,138,295 | 2/1979 | De Nora et al. | 204/98 |
| 4,139,448 | 2/1979 | Wallace | 204/256 |
| 4,204,920 | 5/1980 | Kurtz et al. | 204/98 |
| 4,265,719 | 5/1981 | Ezzell et al. | 204/98 |
| 4,344,832 | 8/1982 | Dahlberg | 204/282 |
| 4,401,530 | 8/1983 | Clere | 204/98 |
| 4,409,074 | 10/1983 | Iijima et al. | 204/98 |

FOREIGN PATENT DOCUMENTS 1487284 9/1977 United Kingdom.

Primary Examiner—John F. Niebling
Assistant Examiner—Kathryn Gorgos

[57] ABSTRACT

An alkali metal salt solution is electrolyzed in an electrolytic cell with at least two electrode compartments adapted to being separated by a membrane. At least one electrode compartment contains at least one means defining a space adapted to receive a portion of membrane surface during operation of the cell. By maintaining the pressure higher in one electrode compartment than the other the membrane portion is pushed toward and into the membrane receiving space such that any wrinkles formed on the membrane are removed.

25 Claims, 3 Drawing Sheets

ELECTROLYTIC CELL AND METHOD OF OPERATION

CROSS-REFERENCE TO RELATED APPLICATION

This is a continuation of application Ser. No. 667,949, filed Nov. 5, 1984, now abandoned.

BACKGROUND OF THE INVENTION

This invention relates to electrolytic cells and a method of operating such cells. More particularly, this invention relates to electrolytic cells of the membrane-type and a method of tensioning the membrane used in such cells.

Electrolytic cells of the "membrane-type" are well known in the art. The membrane-type cells employ a membrane as opposed to a diaphragm to separate an anode compartment containing anolyte from a cathode compartment containing catholyte. The membranes employed are usually sheet-like and made of material, such as fluoropolymer ion-exchange material which are capable of transporting electrolyte ions while being substantially hydraulically-impermeable. Diaphragms on the other hand, which are usually made of asbestos, permit limited, but substantial, flow through of aqueous electrolyte solution.

Electrolytic cells employing membranes include, for example, monopolar and bipolar type cells including filter press cells. U.S. Pat. Nos. 4,108,742 and 4,111,779, for example, describe typical bipolar cells. The bipolar cell generally includes repeating units of an anode compartment with an anode therein and cathode compartment with a cathode therein separated by a membrane. The electrolytic cells above are typically employed for the electrolysis of aqueous salt solutions, for example, alkali metal chloride brines used in the production of chlorine and alkali metal hydroxides.

When ion-exchange membranes are employed in membrane-type electrolytic cells, it is advantageous to keep the membrane stretched and taut between the electrode compartments to provide a uniform flat membrane surface and minimize wrinkling of the membrane. Wrinkles in the membrane can form because the membranes tend to absorb water and thus swell a certain percentage after they are installed in a cell and contacted with electrolyte at cell operating conditions. The amount of swelling depends on the amount of water in the electrolyte. Swelling of the membrane causes the membrane to lose its tension or tautness between the electrode compartment in a cell which then causes wrinkling to occur on the membrane. Wrinkles formed on a membrane surface can trap gas bubbles, such as chlorine and hydrogen, during an electrolytic process, for example, in the production of chlorine and caustic. These trapped bubbles increase the electrical resistance and power consumption of a cell and, thus, reduce the efficiency of the cell.

In addition to the problem of trapping gas bubbles, a loose or expanded membrane may vibrate excessively between the electrode compartments during operation of the cell and eventually may damage the membrane due to mechanical wear. It is also known that wrinkles are sites for the initiation of cracks in the membrane. Cracks permit leakage of electrolyte between the cell compartments which result in contamination of the cell products and reduced cell performance. Cracks can also occur on the barrier layer of a multi-layered membrane which can allow back migration of ions, such as OH$^-$ migration into the catholyte causing loss of cell efficiency.

In an attempt to solve the membrane wrinkling problem described above, methods have been used to pretreat or precondition the membrane prior to inserting it between the electrode compartments in a cell. For example, the membrane described in U.S. Pat. No. 4,376,030 is presoaked in a solvent and then air dried prior to its installation in a cell to minimize the swelling of the membrane, and thus reduce the slack and wrinkling during actual operation of the cell. It is, however, desired to further reduce the slack and wrinkling of membranes used in the membrane-type electrolytic cells.

SUMMARY OF THE INVENTION

This invention provides an electrolytic cell with at least two electrode compartments adapted to being separated by a membrane. At least one of the electrode compartments contain at least one means defining a space adapted to receive at least a portion of the membrane surface during operation of the cell. The method includes providing an electrolytic cell having at least two electrode compartments adapted to being separated by a membrane and at least one of the electrode compartments contain at least one means defining a space adapted to receive at least a portion of the membrane surface during operation of the cell and maintaining one of the electrode compartments at a greater pressure than the other to press the membrane against one electrode and into at least one means defining a space adapted to receive a portion of the membrane, said membrane receiving means contained in the electrode compartment with the lower pressure. The process of electrolyzing an alkali metal salt is carried out in the above apparatus by passing a current from one electrode to another.

DETAILED DESCRIPTION OF PREFERRED EMBODIMENT

Figure 1:
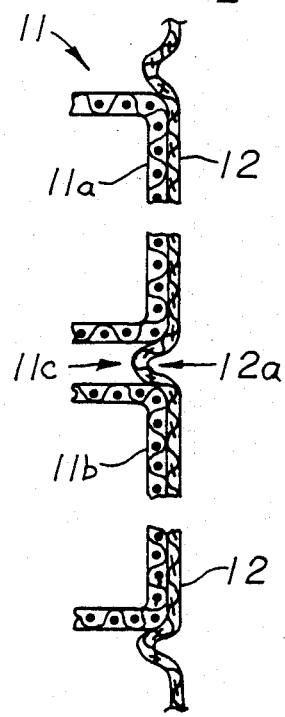
FIG. 1 is a cross-sectional top view of one embodiment of the present invention showing an electrode-membrane assembly.

Before describing the present invention in detail, it is important to define the following terms used herein.

"Electrode" as used herein means a single member or a plurality of members defining an anode or cathode used in an electrolytic cell. The material of the electrode can be any well-known material used for the purpose of such electrode. If the electrode used is an anode, for example, the material may be a valve metal such as titanium. If the electrode is a cathode, the material may be steel, stainless steel, nickel or nickel-coated steel. The anode or cathode can be solid, punched plate, expanded mesh or wire screen. The electrode can be any shape desired. Preferably, the electrode is rectangular in shape. The anode is preferably a rectangular titanium mesh material. The cathode is preferably a rectangular nickel mesh material. The electrode may be coated with a suitable electro-conducting electrocatalytically active material. For example, where the electrode is to be used as an anode, e.g., in the electrolysis of aqueous alkali metal chloride solution, the anode may be coated with one or more platinum group metals, that is, platinum, rhodium, iridium, ruthenium, osmium or palladium and/or an oxide of one or more of these metals. The coating of platinum group metal and/or oxide may be present in admixture with one or more non-noble metal oxides, particularly one or more film-forming metal oxides, e.g., titanium dioxide. Electro-conducting electrocatalytically active materials for use as anode coatings in an electrolytic cell, particularly a cell for the electrolysis of aqueous alkali metal chloride solution, and methods of application of such coatings, are well known in the art.

Where the electrode is to be used as a cathode, e.g., in the electrolysis of aqueous alkali metal chloride solution, the cathode may be coated with a material designed to reduce the hydrogen over-potential at the cathode. Suitable coatings are known in the art.

"Membrane" as used herein means any sheet-like membrane used in an electrolytic cell for separating the cell into two electrode compartments, in particular, an anode compartment containing the anode and a cathode compartment containing a cathode. The membranes are preferably cation exchange membranes of fluoropolymer ion exchange material which is capable of transporting electrolysis ions while being hydraulically impermeable. suitable membranes include membranes of Nafion ® material manufactured by E. I. duPont de Nemours and Company or membranes of Flemion ® material manufactured by Asahi Glass Company.

"Electrolytic cell" as used herein means any cell which utilizes a membrane as a separator. The cells can be monopolar or bipolar of the filter pressor flat platetype. It is preferred to use filter press, bipolar electrode-type electrolytic cells in the present invention. Electrolytic cells herein will be described in reference to those typically used for the electrolysis of aqueous salt solutions, for example, alkali metal chloride salt solutions used in the production of chlorine and alkali metal hydroxide, i.e., chlor-alkali cells, but are not to be limited thereto. It is to be understood that other cells, such as fuel cells or cells employed in hydrolysis of water, are intended to be covered.

The phrase "means defining a space adapted to receive a portion of the membrane surface" or "membrane receiving space" as used herein means a narrow opening such as a slit or a slot or groove across the surface of the electrode, a coplanar gap between two or more electrode member sections, or a coplanar gap between an electrode member section and the electrode frame of the electrolytic cell. The opening, groove or gap is independent and separate from the openings or perforations on the surface of an electrode such as a mesh electrode and the opening groove or gap may be any shape desired. The size of the opening, groove, or gap is generally larger than the mesh openings of a conventional wire mesh electrode. Preferably, the opening may be a narrow slot in the range of about 1/32 inch to about ⅛ inch across the anode surface. The size of the opening, groove or gap, however, should be sufficient to take up membrane "slack", during operation of the cell.

"Slack" as used herein means that portion of the membrane which is loose and not tightly secured within an electrode cell. In addition, slack may include wrinkles which form on the surface of the membrane. Membrane slack may occur before or during use of an electrolytic cell.

With reference to FIG. 1, there is shown an electrode-membrane assembly comprising an electrode, indicated generally by numeral 11, contiguous with a membrane 12. Electrode 11 comprises electrode portions or sections 11a and 11b which are separated by a space or gap indicated generally by numeral 11c therebetween. The membrane slack indicated generally by numeral 12a, is taken up and positioned in gap 11c between electrode sections 11a and 11b. The gap 11c may be in the form of a slot between electrode sections. Alternatively, when a single electrode member is used, the slot may be anywhere on the surface of the electrode. Contacting or pressing the membrane 12 against the electrode and forcing the membrane slack 12a into the space 11c between the electrode section 11a and 11b may be carried out by maintaining pressure on the side of the membrane 12 not facing the electrode slightly greater than that on the other side of the membrane. By forcing the slack 12a into the space 11, the membrane 12 is tensioned and any wrinkles present in the membrane are removed.

Figure 2:
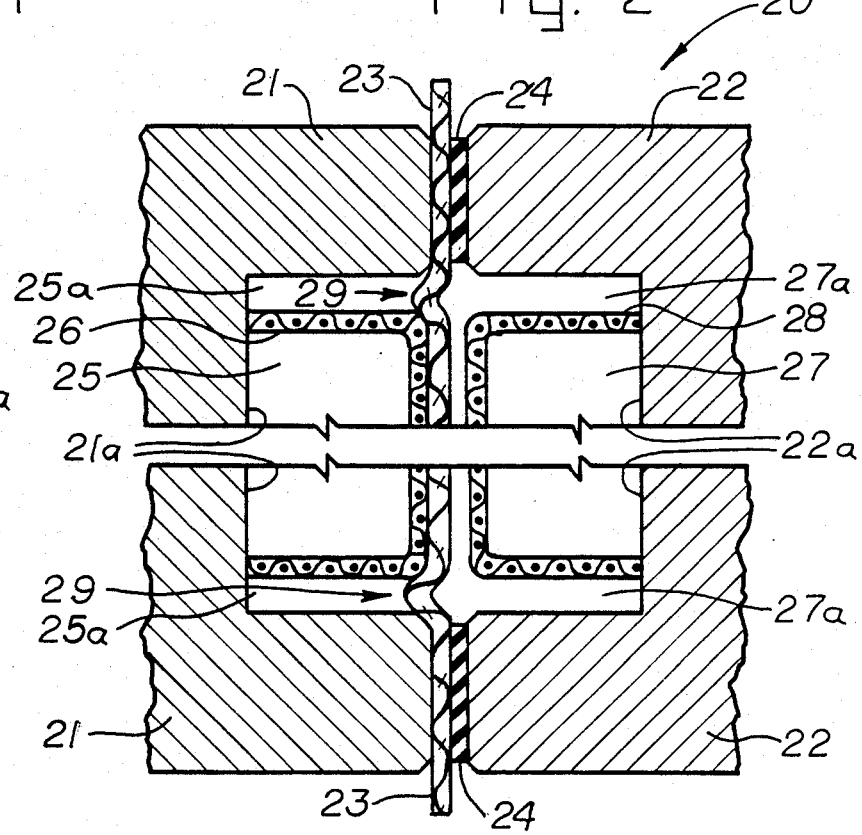
FIG. 2 is a cross-sectional top view of one embodiment of the present invention showing a portion of an electrolytic cell with an electrode-membrane assembly.

FIG. 2 shows a membrane, filter press-type electrolytic cell indicated generally by the numeral 20 with an anode cell frame portion 21, a cathode cell frame portion 22, and a membrane 23 interposed between the cell frame portions 21 and 22. The frame portions are sealed together by a suitable means such as a gasket 24.

The membrane 23 separates the anode frame portion 21 and cathode frame portion 22 into an anode compartment 25 containing an anode 26 and a cathode compartment 27 containing a cathode 28 therein. In this embodiment both the anode 26 and the cathode 28 are in the form of a single section of a wire mesh. However, the anode 26 or the cathode 28 may be in the form of a plurality of sections better illustrated in FIG. 3. The anode is preferably made of titanium and the cathode is preferably made of nickel. Both electrode compartments 25 and 27, in this instance, are provided with a space 25a and 27a, respectively, defined by the periphery of the electrode and the inside of the electrode frame for receiving any membrane slack, indicated generally by numeral 29, in FIG. 2, which is present during operation of the cell. A pressure differential is provided during operation of the cell, to press the membrane against one of the electrodes. For example, as shown in FIG. 2, the membrane 23 is shown pressed against the anode 26 with the membrane slack 29 pushed into the space 25a along the periphery of the anode 26. The membrane 23 is pressed against the anode by maintaining the hydrostatic head in the cathode compartment 27, higher than in the anode compartment 25. Thus, any wrinkles formed on the membrane may be removed by maintaining the pressure differential in the cell.

It is an important feature of the present invention that a space or gap be provided in one of the electrode compartments for receiving membrane slack which may be caused by membrane expanding during operation of a cell in order to prevent wrinkles from forming on the surface of the membrane. Wrinkles on the membrane may lead to cracks after a period of cell operation which could result in leakage of electrolyte between electrode compartments and the loss of cell efficiency. The anode 26 or cathode 28 may be attached, such as by welding, directly to the cell frame portions 21 and 22, respectively, or the anode 26 or cathode 28 can be spaced from the back wall portion 21a and 22a of the cell frame portions 21 and 22, respectively, with a stand-off means (not shown). This particular spacing is provided so as to provide room for the electrolyte and electrolysis product to circulate in the electrode compartment.

The anode stand-off means and cathode stand-off means, typically, serve as an electrical current conductor means to electrically connect the anode and cathode of a bipolar filter press-type electrode. The connection is usually made through the cell frame wall portion 21a and 22a. Although this invention is particularly applicable to cells having bipolar electrodes, it is to be understood that the present invention is not limited to bipolar electrodes and, therefore, the terms "anode" and "cathode" in this specification and in the appended claims may refer to monopolar electrodes as well as bipolar electrodes that act as an anode or a cathode.

The type of anode or cathode stand-off means useful in the invention may be in the form of connector bars, screws, rods, and bolts. The anode or cathode can be welded or otherwise attached to the cell frame directly or to the stand-off means.

Figure 3:
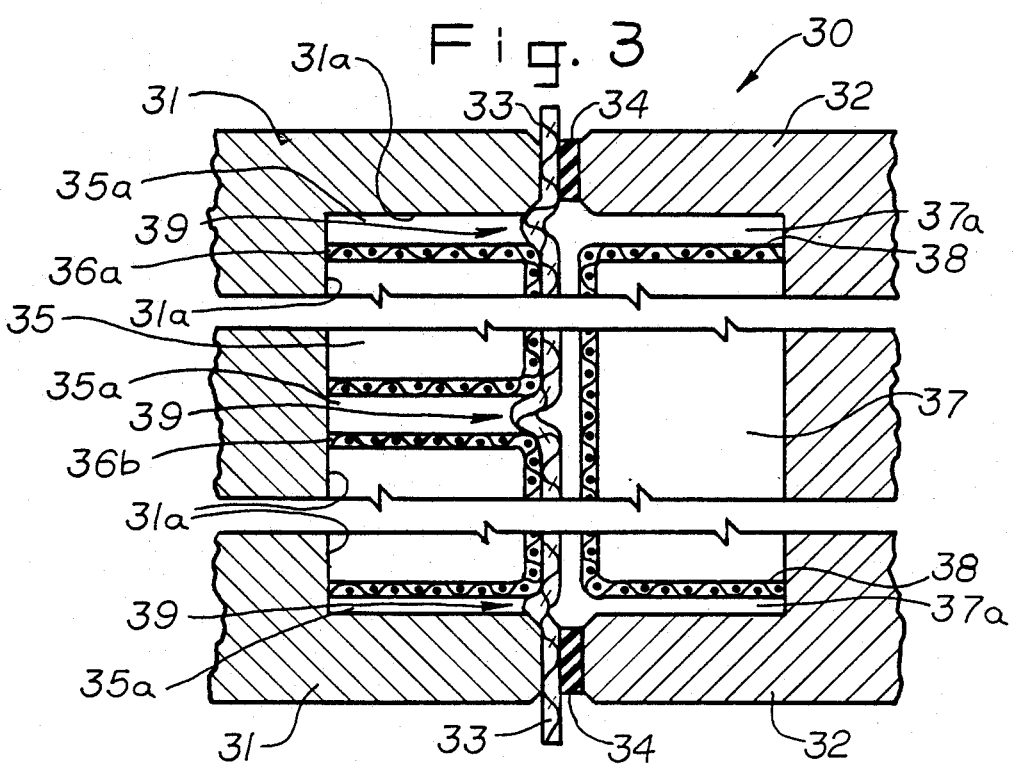
FIG. 3 is a cross-sectional top view of another embodiment of the present invention showing a portion of an electrolytic cell with an electrode-membrane assembly.

Another embodiment of the present invention is shown in FIG. 3. Referring to FIG. 3, there is shown a membrane, filter press-type electrolytic cell, indicated generally by numeral 30, with an anode frame portion 31, cathode frame portion 32, and a membrane 33 interposed between the cell frame portions 31 and 32.

The membrane 33 separates the anode frame portion 31 from the cathode frame portion 32 forming anode compartment 35 containing an anode made up of two anode sections 36a and 36b and cathode compartment 37 containing a cathode 38. The anode sections 36a and 36b are spaced apart from each other and the inside wall 31a of the anode frame portion 31 by a gap 35a. A gasket 34 is interposed between the membrane and the cathode frame portion 32 to provide a seal. Membrane slack 39 is pushed into the gap 35a between anode sections 36a and 36b during operation of the cell by maintaining the hydrostatic head in the cathode compartment 37 higher than in the anode compartment 35.

Figure 4:
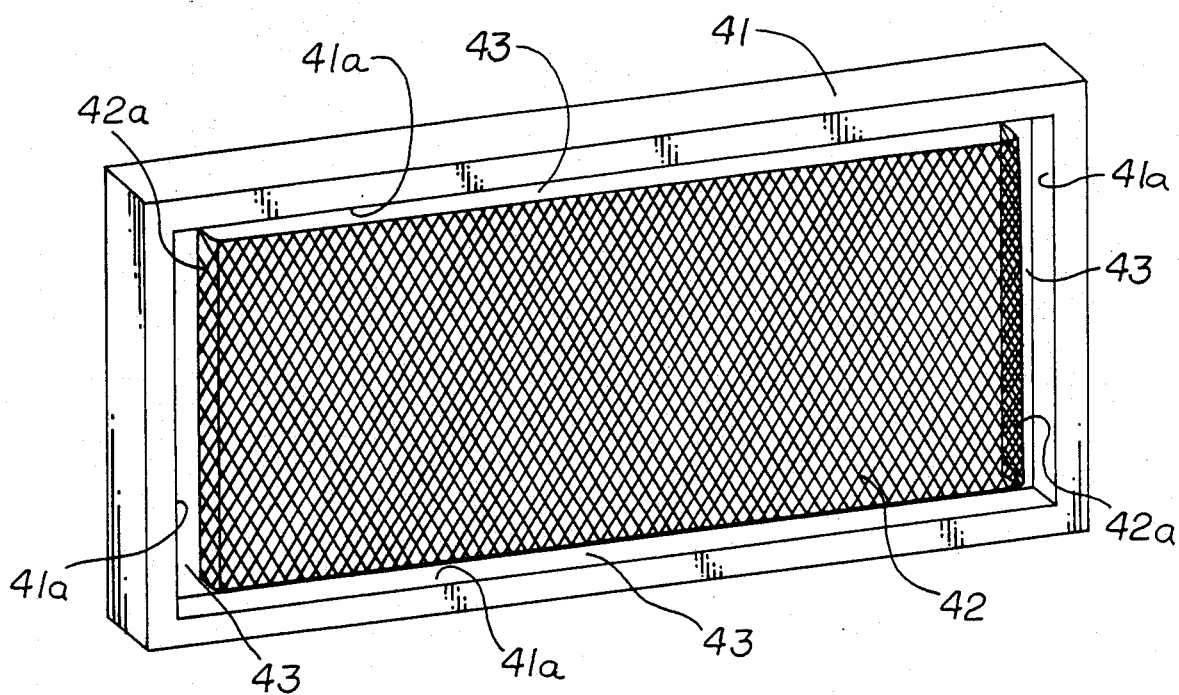
FIG. 4 is a perspective view of one embodiment of the present invention showing an electrode in an electrode frame member.
Figure 5:
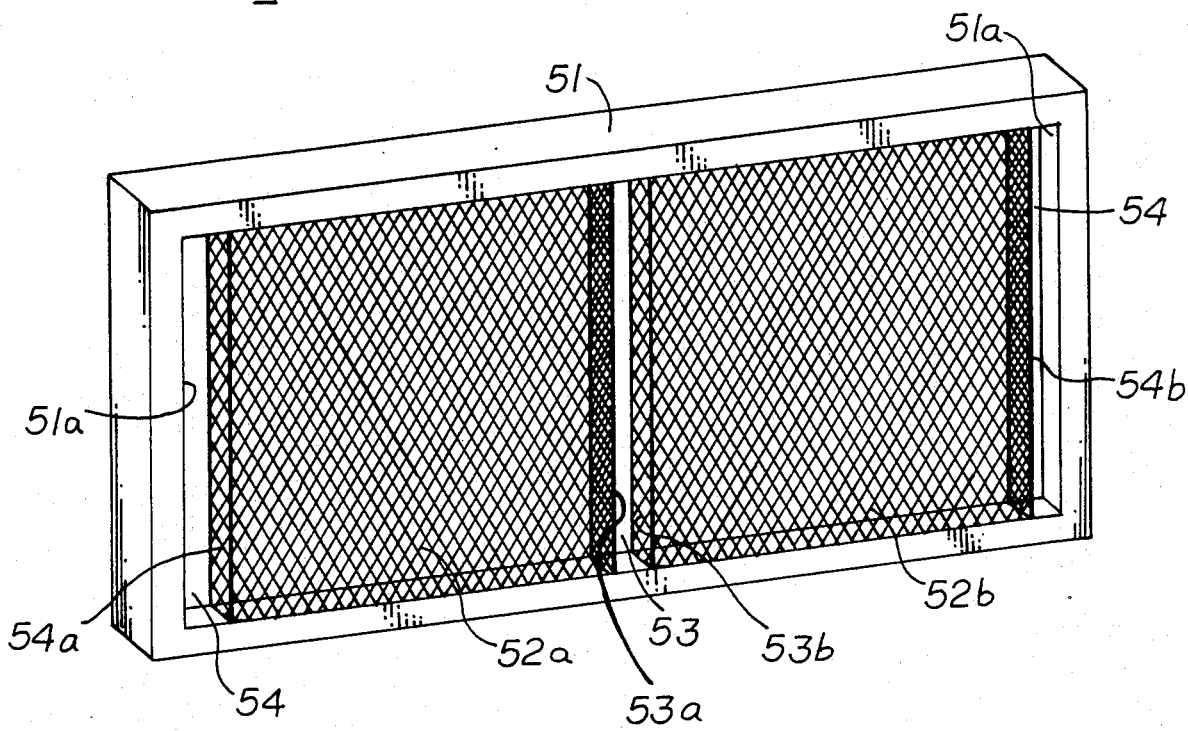
FIG. 5 is a perspective view of another embodiment of the present invention showing an electrode in two sections in an electrode frame member.
Figure 6:
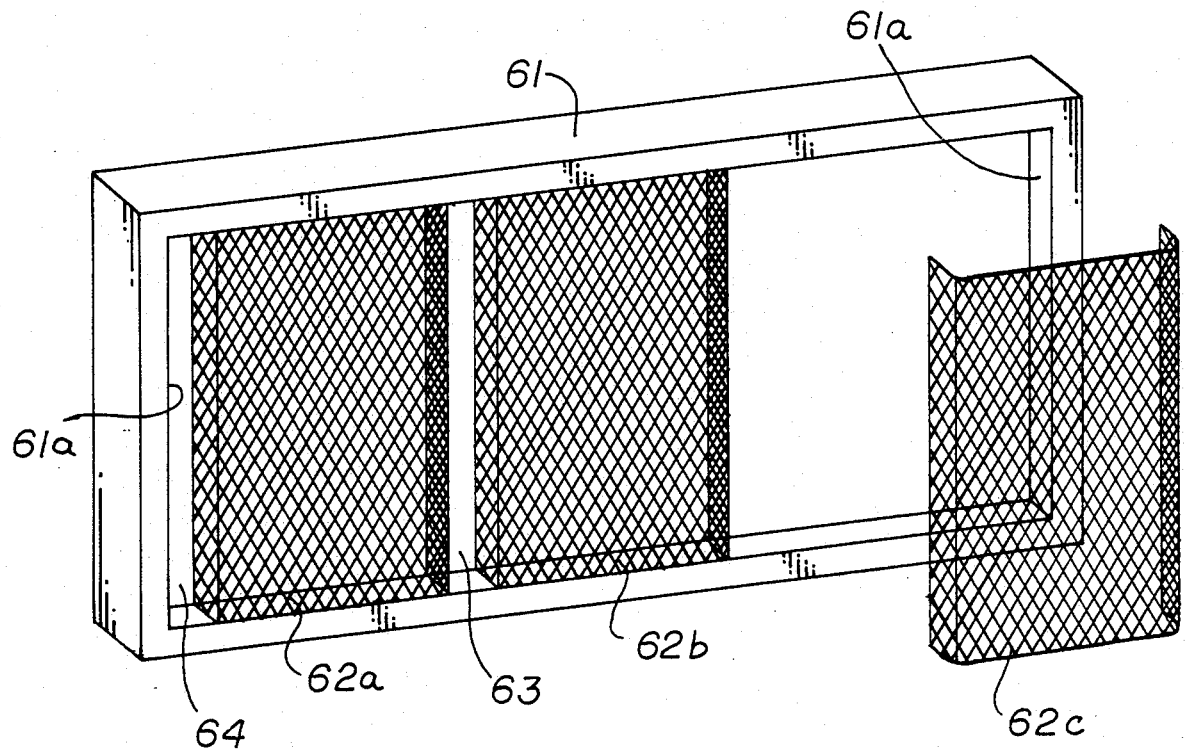
FIG. 6 is a perspective view of an embodiment of the present invention showing an electrode in three sections in an electrolytic frame member with one electrode section pulled out of the electrode frame member.

With reference to FIG. 4, there is shown an electrode frame portion 4; of an electrolytic cell with a single electrode section 42 therein. A space or gap 43, defined by the inside surface 41a of the electrode frame portion 41 and the perimeter of electrode section 42, is provided for taking up membrane slack during operation of the cell. The ends 42a of the electrode section are curved inwardly into the electrode frame portion 41. In FIG. 4, and FIGS. 5 and 6 below, the electrode may be an anode or a cathode.

FIG. 5 shows an electrode frame portion 51 of an electrolytic cell with two electrode sections 52a and 52b. The electrode sections 52a and 52b are separated by a narrow gap 53 defined by the inside edges 53a and 53b, which are curved inwardly into the electrode frame portion 51, of the electrode sections 52a and 52b, respectively. In addition, FIG. 5 shows a space or gap 54 defined by the outside edges 54a and 54b, which are curved inwardly into the electrode frame portion 51, of the electrode sections 52a and 52b, respectively, and the inside surface 51a of the frame portion 51.

In FIG. 6, there is shown an electrode frame portion 61 with an electrode defined by the electrode sections 62a, 62b and 62c . The electrode section 62c is shown removed from the electrode frame portion 61. A gap, indicated generally by numeral 63 between two anode sections, is also shown. In addition, a space or gap is shown defined by one end of the anode section 62a and the inside surface 61a of frame portion 61. With the electrode section 62c installed in the frame, a gap will exist between the electrode section 62b and 62c, and between the inside surface 61a and the electrode section 62c. In FIG. 6, as well as in FIGS. 4 and 5 above, the two ends of the electrode or electrode sections are shown curved inwardly and into the electrode frame portion but it is within the scope of the invention to have the complete edge along the perimeter of the electrode or electrode sections curved inwardly and into the electrode frame portion.

In carrying out the method of the present invention, an electrolyzing current is passed between an anode and a cathode of a chlor-alkali cell of the membrane-type, the anode and cathode being separated by a permselective ionic membrane. Operation of the chlor-alkali cell contemplated by the instant invention are at their normal current density, temperature and catholyte and anolyte concentrations. Preferably, the current density employed ranges from about 1.0 to about 3.0 ASI at a cell operating temperature of approximately 70° C. to about 95° C. The concentration of anolyte is preferably about 16 weight percent to about 20 weight percent NaCl brine solution and the catholyte may contain from about 12 weight percent to about 40 weight percent sodium hydroxide. The differential pressure between the anode and cathode compartment is sufficient to maintain the membrane in contact with either the anode or the cathode. Preferably, the hydrostatic head of pressure is maintained higher in the cathode compartment than in the anode compartment. Preferably, the hydrostatic head in the cathode compartment is maintained at about 6 inches to about 50 inches of water greater than in the anode compartment. It is within the scope of the invention, however, to maintain the anode compartment at about 6 inches to about 50 inches of water greater than in the cathode compartment to press the membrane against the cathode in the cell.

The following example is illustrative of the present invention.

EXAMPLE

A series of three 4 feet by 10 feet bipolar chlor-alkali cells with end plates were assembled. The anode consisted of three titanium mesh sections, two end sections were 31 13/16 by 45⅛ inches and one center section was 46 by 45⅛ inches. The active surface area of the anode was 5,000 square inches. The anode sections were fixed into the anode compatment to establish a 1/16 inch gap between each of the three sections. The cathode consisted of three nickel mesh sections with the same dimensions as the anode. The cathode sections were fixed into the cathode compartment to establish a 1/16 inch gap between each of the three sections. The separator was a 4 by 10 foot sheet of Nafion ® permselective ionic membrane. After assembly of the cell, the cell was operated at 2.0 ASI. The voltage averaged 3.02 volts at a cell temperature of 90° C. and at a caustic concentration of 12.8 weight percent NaOH. The above-constructed cell with a 3 millimeter electrode gap was operated for 40 days with an average caustic current efficiency of about 85 percent. The hydrostatic head in the cathode compartment was kept at 15 inches of water higher than in the anode compartment. After 40 days of operation, the cell was disassembled and the membrane was visually inspected for wrinkles. The membrane was pressed against the anode member and into the slots with no visible wrinkles present on the membrane surface.

What is claimed is:

1. An electrolytic cell of the filter press-type comprising
   (a) a membrane having slack,
   (b) an anode compartment containing a generally planar anode,
   (c) a cathode compartment containing a generally planar cathode, said electrode compartments separated by the membrane,
   (d) a means for providing a higher pressure in one of said compartments so as to cause said membrane to press against one of said electrodes whereby membrane slack is reduced, the membrane having a uniform flat membrane surface when in contact with the electrode, the electrode contiguous with the membrane having a generally planar surface contacting the membrane, and
   (e) at least one means defining a space other than perforations on the surface of the anode or cathode for receiving membrane slack during operation of the cell, said space provided in the electrode compartment having the lower pressure and the membrane pressed against the electrode.

2. The cell of claim 1 wherein the membrane receiving means is located in the anode compartment.

3. The cell of claim 2 wherein the membrane receiving means is at least one slot defined in the anode surface.

4. The cell of claim 3 wherein the edges. defining the slot are curved inwardly into the anode compartment and away from the membrane surface.

5. The cell of claim 2 wherein the membrane receiving means is a gap between the anode and the anode cell frame.

6. The cell of claim 5 wherein the edge of the anode defining the gap is curved inwardly into the anode compartment and away from the membrane surface.

7. The cell of claim 5 wherein the membrane receiving means is a gap between the perimeter of the anode and the anode cell frame.

8. The cell of claim 7 wherein the perimeter of the anode is curved inwardly into the anode compartment and away from the membrane surface.

9. The cell of claim 2 wherein the membrane receiving means is defined by at least one slot in the anode surface and at least one gap between the anode and the anode cell frame.

10. The cell of claim 9 wherein the edges defining the slot and the edges of the anode defining the gap are curved inwardly into the anode compartment and away from the membrane surface.

11. The cell of claim 2 wherein the membrane receiving means is defined by at least one slot in the anode surface and a gap between the perimeter of the anode and the anode cell frame.

12. A method of operating an electrolytic cell comprising
    providing an electrolytic cell with an anode compartment containing a generally planar anode, a cathode compartment containing a generally planar cathode, a membrane having slack separating the anode compartment from the cathode compartment, and at least one means defining a space other than perforations on the surface of the anode or cathode for receiving said slack during operation of the cell, and
    creating a higher pressure in at least one electrode compartment than in the other electrode compartment such that the membrane is optionally pushed toward and against the anode or cathode whereby membrane slack is pushed into said space, said membrane receiving space contained in the electrode compartment with the lower pressure.

13. The method claim 12 wherein a pressure is maintained higher in the cathode compartment than in the anode compartment and the membrane is pushed against the anode and the membrane slack is pushed into the mmbrane receiving space, said membrane receiving space contained in the anode compartment.

14. The method of claim 13 wherein the membrane receiving means is a slot in the anode surface.

15. A method of electrolyzing an alkali metal salt comprising
    providing an electrolytic cell with an anode compartment containing a generally planar anode, a cathode compartment containing a generally planar cathode, a membrane having slack separating the anode compartment from the cathode compartment, and at least one means defining a space other than perforations on the surface of the anode or cathode for receiving said slack during operation of the cell, said space provided in at least one electrode compartment,
    creating a higher pressure in at least one electrode compartment than in the other electrode compartment containing the membrane receiving space such that the membrane is pressed against the anode or cathode whereby membrane slack is pressed into the membrane receiving space to retain the membrane taut, and
    passing a current through the anode and cathode to electrolyze the alkali metal salt.

16. The method of claim 15 wherein the anode cmpartment contains the membrane receiving means and the pressure in the cathode compartment is higher than the pressure in the anode compartment.

17. The method of claim 16 wherein the membrane receiving means is a slot in the anode surface.

18. The method of claim 17 wherein the edges defining the slot are curved inwardly into the anode compartment and away from the membrane surface.

19. The method of claim 15 wherein the cathode compartment contains the membrane receiving means and the pressure of anode compartment is higher than the pressure in the cathode compartment.

20. The method of claim 15 wherein the alkali metal salt is sodium chloride.

21. A method of operating an electrolytic cell comprising
    providing an electrolytic cell with an anode compartment containing an anode, a cathode compartment containing a cathode, a membrane having slack separating the anode compartment from the cathode compartment, and at least one gap between the anode and the anode cell frame in the anode compartment for receiving said slack, and creating a higher pressure in the cathode compartment than in the anode compartment such that the membrane is pushed against the anode whereby membrane slack is pushed into the gap between the anode and the anode cell frame.

22. A method for electrolyzing an alkali metal salt comprising providing an electrolytic cell with an anode compartment containing an anode, a cathode compartment containing a cathode, a membrane having slack separating the anode compartment from the cathode compartment, and at least one gap between the anode and the anode cell frame in the anode compartment for receiving said slack during operation of the cell, creating a higher pressure in the cathode compartment than in the anode compartment such that the membrane is pressed against the anode whereby membrane slack is pushed into the gap between the anode and the anode cell frame to retain the membrane taut, and passing a current through the anode and cathode to electrolyze the alkali metal salt.

23. A method for electrolyzing an alkali metal salt comprising providing an electrolytic cell with an anode compartment containing an anode, a cathode compartment containing a cathode, a membrane having slack separating the anode compartment from the cathode compartment and at least one gap between the perimeter of the anode and the anode cell frame in the anode compartment for receiving said slack during operation of the cell, creating a higher pressure in the cathode compartment than in the anode compartment such that the membrane is pressed against the anode whereby membrane slack is pushed into the gap to retain the membrane taut, and passing a current through the anode and cathode to electrolyze the alkali metal salt.

24. A method for electrolyzing an alkali metal salt comprising providing an electrolytic cell with an anode compartment containing an anode, a cathode compartment containing a cathode, a membrane having slack separataing the anode compartment from the cathode compartment, and at least one gap between the perimeter of the anode and the anode cell frame in the anode compartment for receiving said slack during operation of the cell, the anode perimeter having an edge curved inwardly into the anode compartment and away from the membrane surface, creating a higher pressure in the cathode compartment than in the anode compartment such that the membrane is pressed against the anode whereby membrane slack is pushed into the gap to retain the membrane taut, and passing a current through the anode and cathode to electrolyze the alkali metal salt.

25. An electrolytic cell of the filter press-type comprising (a) a membrane having slack, (b) an anode compartment containing a generally planar anode, (c) a cathode compartment containing a generally planar cathode, said electrode compartments separated by the membrane, (d) a means for providing a higher pressure in one of said compartments so as to cause said membrane to press against one of said electrodes whereby membrane slack is reduced, the membrane having a uniform flat membrane surface when in contact with the electrode, the electrode contiguous with the membrane having a generally planar surface contacting the membrane, the electrode contiguous with the membrane comprised of a plurality of sections, and (e) a space other than perforations on the surface of the anode or cathode for receiving membrane slack during operation of the cell, said space provided in the electrode compartment having the lower pressure and the membrane pressed against the electrode, said space comprising at least one gap between said electrode sections.

* * * * *